(12) United States Patent
Teng et al.

(10) Patent No.: US 6,381,347 B1
(45) Date of Patent: Apr. 30, 2002

(54) HIGH CONTRAST, LOW DISTORTION OPTICAL ACQUISTION SYSTEM FOR IMAGE CAPTURING

(75) Inventors: Harry H. Teng, Stanford, CA (US); Sung-Chan Jo, Seoul (KR)

(73) Assignee: SecuGen, Milpitas, CA (US)

( * ) Notice: Subject to any disclaimer, the term of this patent is extended or adjusted under 35 U.S.C. 154(b) by 0 days.

(21) Appl. No.: 09/191,428

(22) Filed: Nov. 12, 1998

(51) Int. Cl.[7] .................................................. G06K 9/00
(52) U.S. Cl. ......................................... 382/127; 356/71
(58) Field of Search ................................ 382/124–127, 382/116, 312, 315, 321, 275, 108; 356/71; 340/5.53, 5.83; 902/3, 6; 713/186; 359/438, 638, 831, 837; 358/511

(56) References Cited

U.S. PATENT DOCUMENTS

| | | | |
|---|---|---|---|
| 3,527,535 A | 9/1970 | Monroe | 356/71 |
| 3,771,124 A | * 11/1973 | McMahon | 340/146.3 E |

(List continued on next page.)

FOREIGN PATENT DOCUMENTS

| | | | | |
|---|---|---|---|---|
| CA | 1 286 032 | 7/1991 | ............ | A61B/5/117 |
| DE | 19 509 751 | 9/1996 | ............ | A61B/5/117 |
| EP | 0 308 162 A2 | 3/1989 | ............ | A61B/5/10 |
| EP | 0 617 919 A2 | 10/1994 | ............ | A61B/5/117 |
| EP | 0 847 024 A2 | 6/1998 | ............ | G06K/9/00 |
| EP | 0 867 828 A2 | 9/1998 | ............ | G06K/9/00 |
| EP | 0 867 829 A3 | 9/1998 | ............ | G06K/9/00 |
| EP | 0 867 829 A2 | 9/1998 | ............ | G06K/9/00 |
| JP | 361145686 A | 7/1986 | ............ | G06K/9/00 |
| JP | 361221883 A | 10/1986 | ............ | G06K/9/00 |
| JP | 62074177 A | 4/1987 | ............ | G06K/9/20 |
| JP | 402133892 A | 5/1990 | ............ | G06K/9/00 |
| JP | 402188888 A | 7/1990 | ............ | G06K/9/00 |
| JP | 403095693 A | 4/1991 | ............ | G06K/9/00 |
| JP | 03246693 A | 12/1991 | ............ | G06K/9/00 |
| JP | 403292578 A | 12/1991 | ............ | G06K/9/00 |
| JP | 7131322 | 5/1995 | .......... | H03K/17/96 |
| KR | 079114 | 8/1994 | ............ | G06K/9/00 |
| KR | 9407344 | 8/1994 | ............ | G06K/9/00 |
| WO | WO 97/14111 A1 | 4/1997 | ............ | G06K/9/00 |
| WO | 98/11478 A2 | 3/1998 | ............ | G06K/1/00 |
| WO | 98/11501 A2 | 3/1998 | ............ | G06K/9/00 |
| WO | 98/11750 A2 | 3/1998 | ............ | H04Q/7/38 |
| WO | WO 98/35118 A1 | 8/1998 | ............ | E05B/49/00 |

*Primary Examiner*—Leo Boudreau
*Assistant Examiner*—Brian P. Werner
(74) *Attorney, Agent, or Firm*—Morrison & Foerster LLP

(57) ABSTRACT

An apparatus and method for acquiring an image of a patterned object such as a fingerprint including a light refracting device, a focusing lens, and a light source. The light refracting device can, for example, be a prism and includes an imaging surface, a light receiving surface and a viewing surface. Incident light from the light source is projected through the light receiving surface and reflected off a surface other than the imaging surface. This reflected light is then projected onto the imaging surface to create an image of the patterned object from substantially all scattered light through the viewing surface. The lens is placed adjacent to the viewing surface to focus the light on an image sensor.

28 Claims, 10 Drawing Sheets

U.S. PATENT DOCUMENTS

| | | | |
|---|---|---|---|
| 3,864,042 A | 2/1975 | Leventhal | 356/71 |
| 3,975,711 A | 8/1976 | McMahon | 340/146.3 E |
| 4,120,585 A | 10/1978 | DePalma et al. | 356/71 |
| 4,135,147 A | 1/1979 | Riganati et al. | 340/146.3 E |
| 4,210,899 A | 7/1980 | Swonger et al. | 340/146.3 E |
| 4,340,300 A | 7/1982 | Ruell | 356/71 |
| 4,414,684 A | 11/1983 | Blonder | 382/4 |
| 4,668,995 A | 5/1987 | Chen et al. | 358/282 |
| 4,681,435 A | 7/1987 | Kubota et al. | 356/71 |
| 4,832,485 A | 5/1989 | Bowles | 356/71 |
| 4,872,203 A | 10/1989 | Asai et al. | 382/4 |
| 4,983,415 A | 1/1991 | Arndt et al. | 427/1 |
| 5,051,576 A | 9/1991 | Schiller | 250/227.11 |
| 5,096,290 A | 3/1992 | Ohta | 356/71 |
| 5,109,427 A * | 4/1992 | Yang | 382/4 |
| 5,177,435 A | 1/1993 | Kiyokawa | 324/158 F |
| 5,177,802 A | 1/1993 | Fujimoto et al. | 382/4 |
| 5,189,482 A | 2/1993 | Yang | 356/73 |
| 5,210,588 A | 5/1993 | Lee | 356/71 |
| 5,222,153 A | 6/1993 | Heiswenger | 382/4 |
| 5,233,404 A | 8/1993 | Lougheed et al. | 356/71 |
| 5,416,573 A | 5/1995 | Sartor, Jr. | 356/71 |
| 5,467,403 A * | 11/1995 | Fishbine et al. | 382/116 |
| 5,548,394 A | 8/1996 | Giles et al. | 356/71 |
| 5,621,516 A * | 4/1997 | Shinzaki et al. | 356/71 |
| 5,623,553 A | 4/1997 | Sekiya | 382/127 |
| 5,635,723 A | 6/1997 | Fujieda et al. | 250/556 |
| 5,680,205 A | 10/1997 | Borza | 356/71 |
| 5,732,148 A | 3/1998 | Keagy et al. | 382/124 |
| 5,737,071 A | 4/1998 | Arndt | 356/71 |
| 5,740,276 A | 4/1998 | Tomko et al. | 382/210 |
| 5,822,445 A | 10/1998 | Wong | 382/127 |
| 5,838,306 A * | 11/1998 | O'Connor et al. | 345/163 |
| 5,963,657 A | 10/1999 | Bowker et al. | 382/127 |
| 5,991,431 A * | 11/1999 | Borza et al. | 382/127 |

* cited by examiner

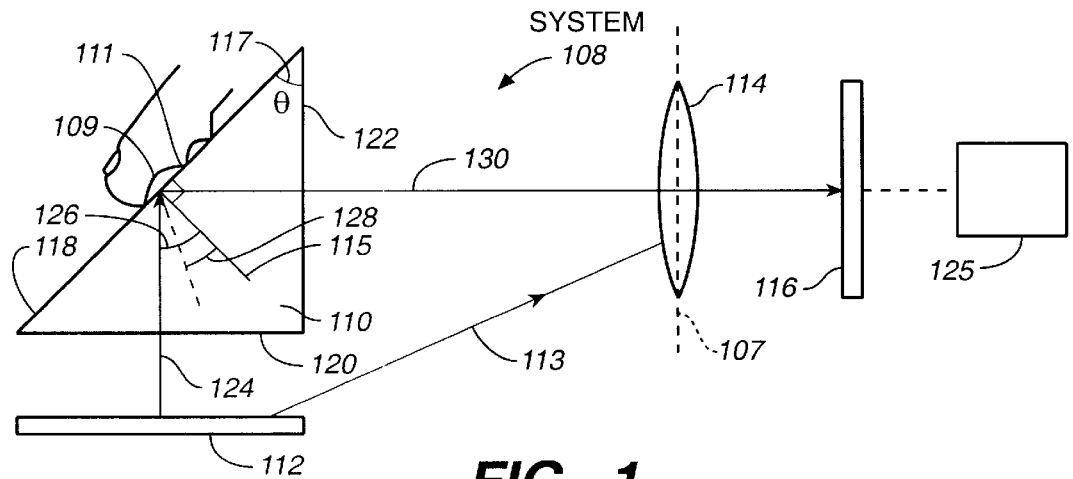
FIG._1
(PRIOR ART)
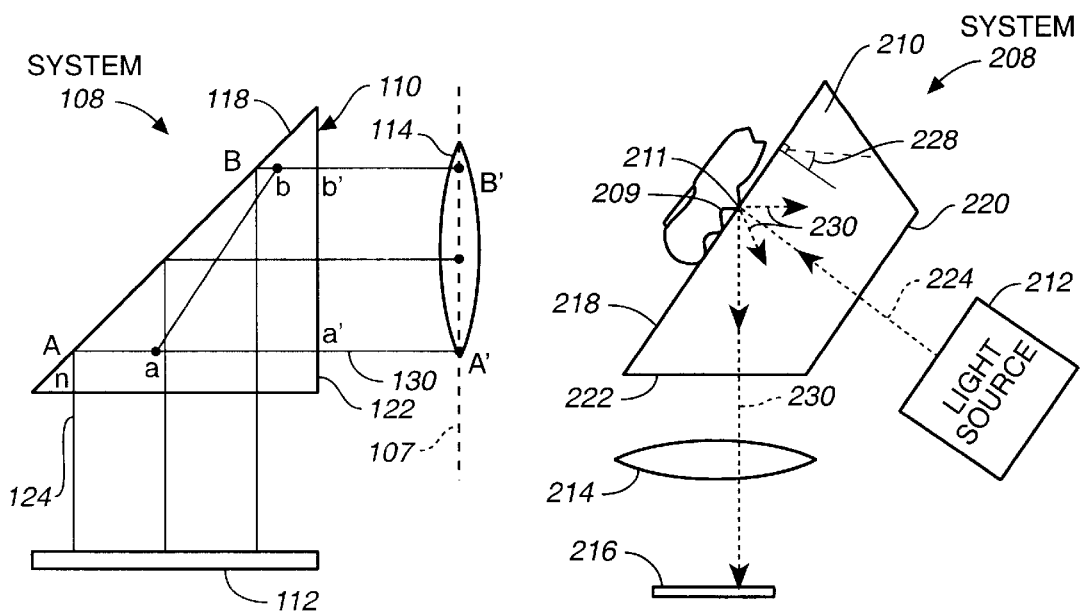
FIG._2
(PRIOR ART)
FIG._3
(PRIOR ART)

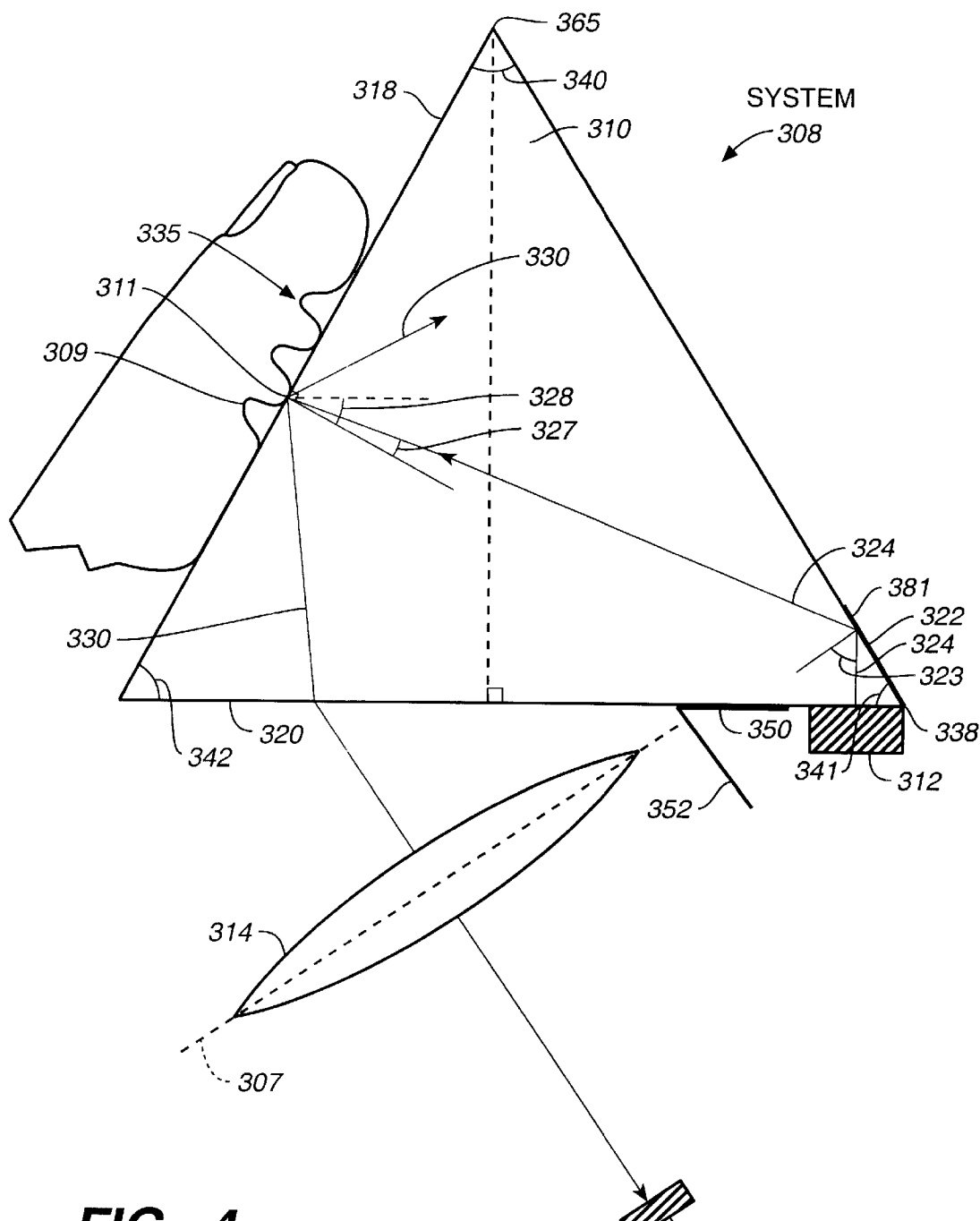
FIG._4
*(FIRST EMBODIMENT)*

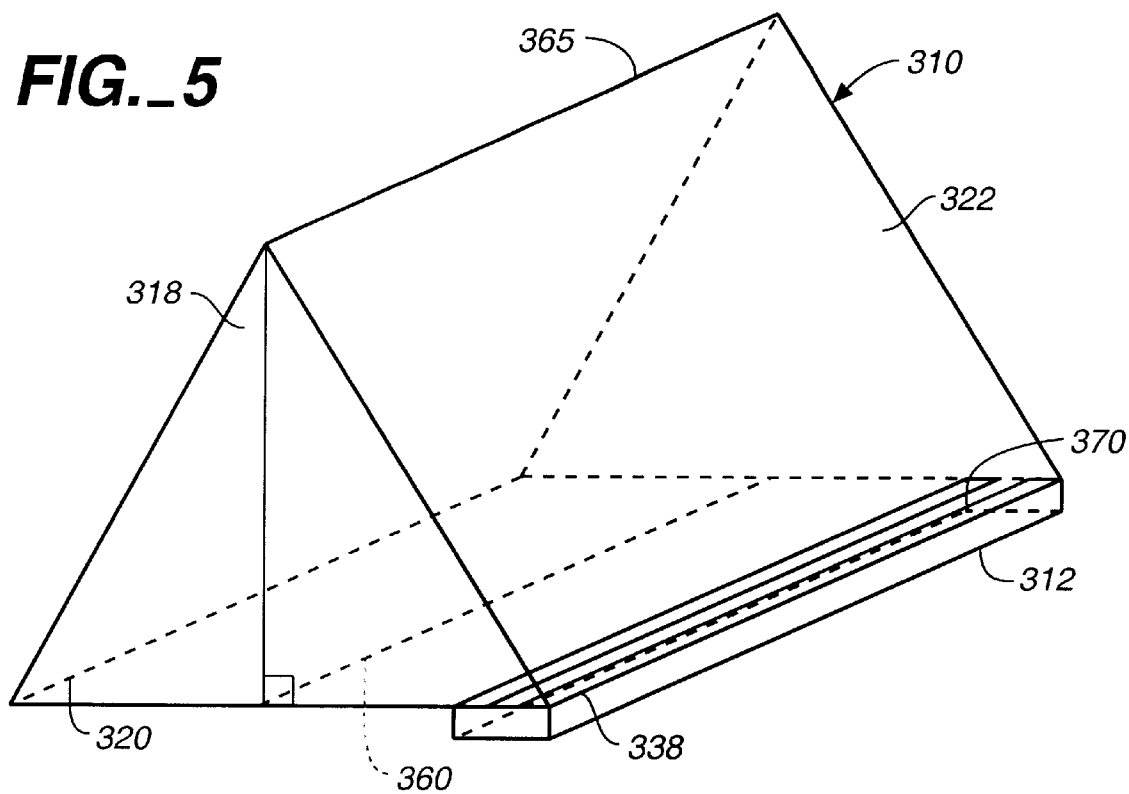
FIG._5

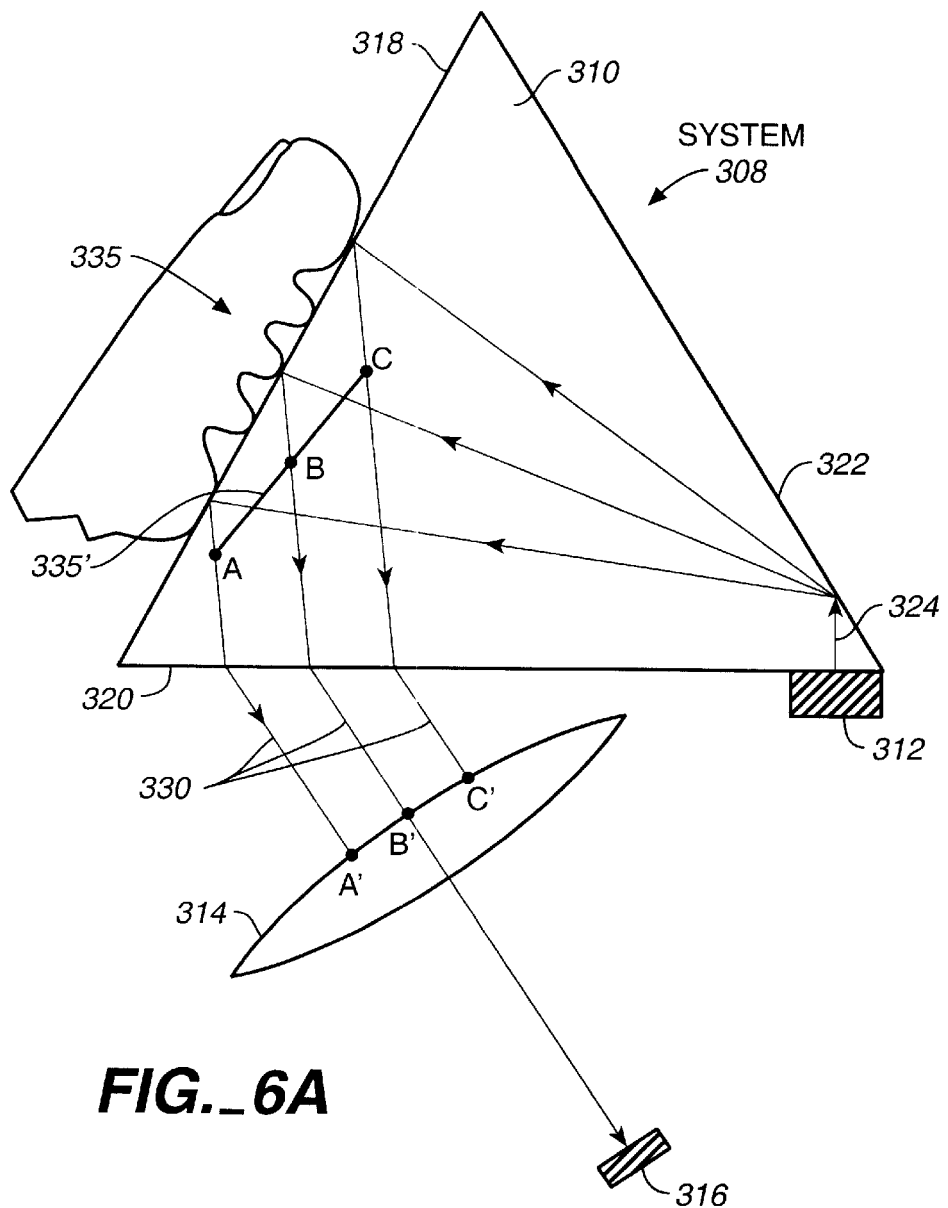
FIG._6A
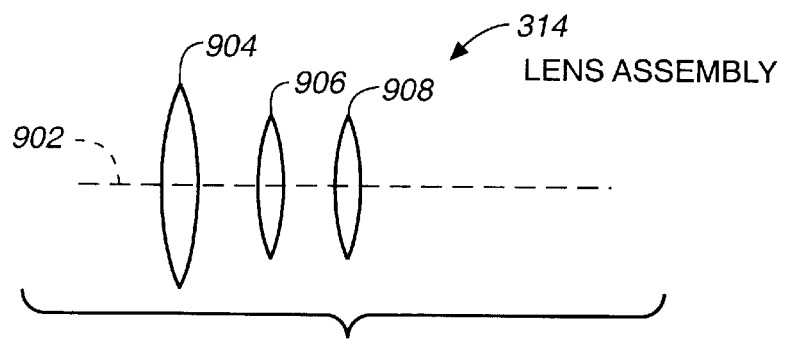
FIG._6B

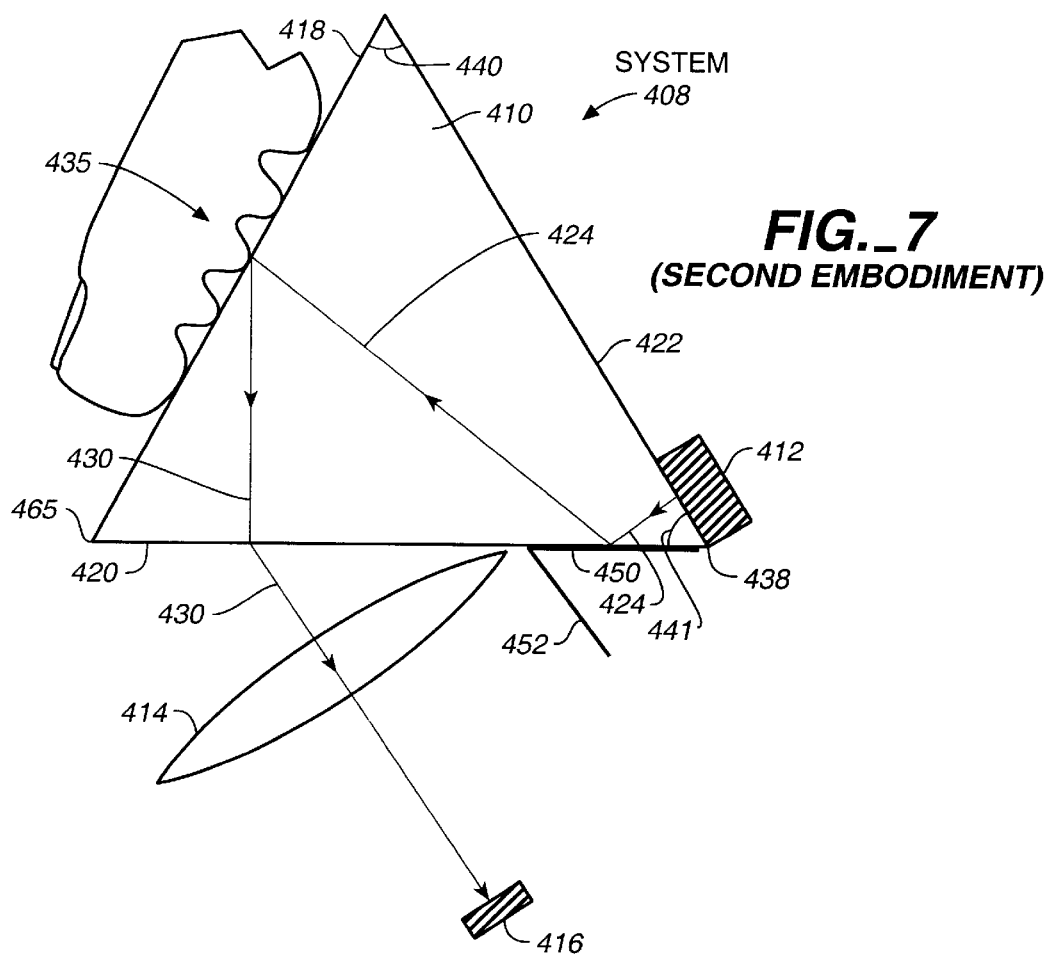
FIG._7
(SECOND EMBODIMENT)
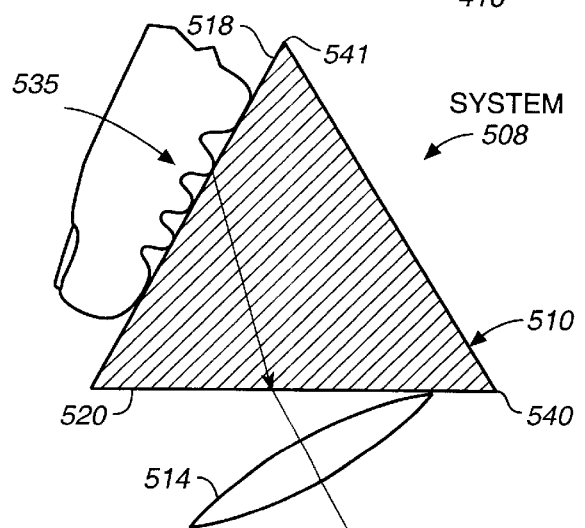
FIG._8
(THIRD EMBODIMENT)

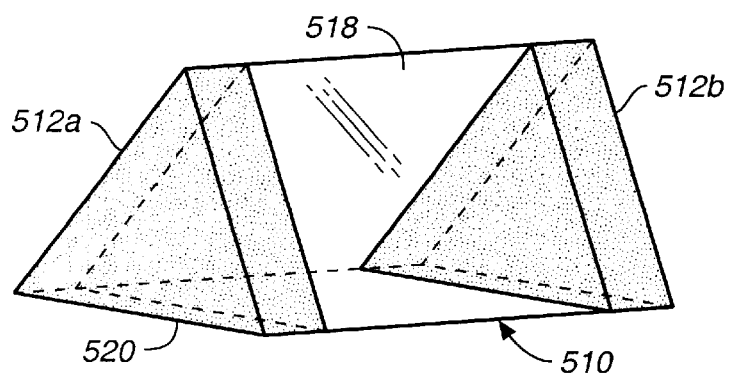
FIG._9
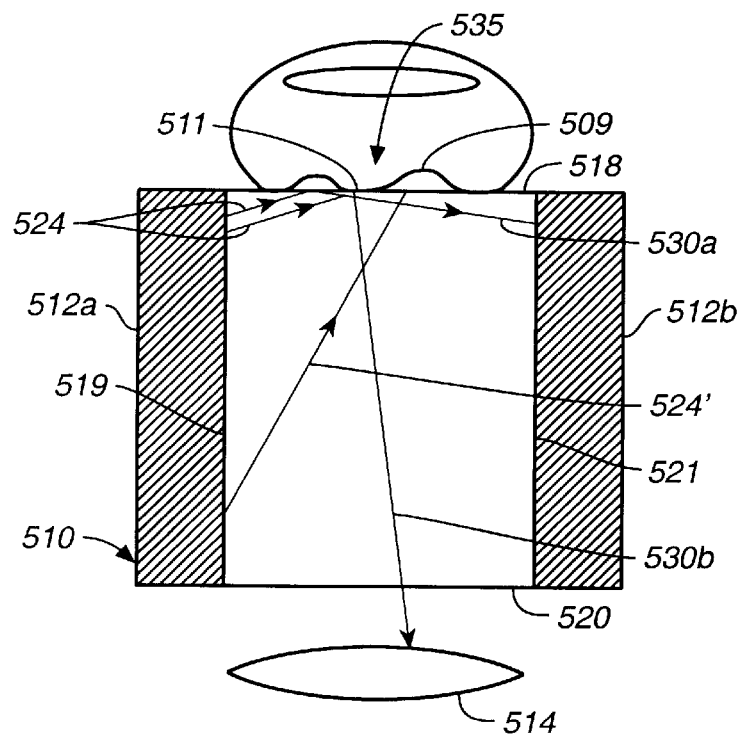
FIG._10A
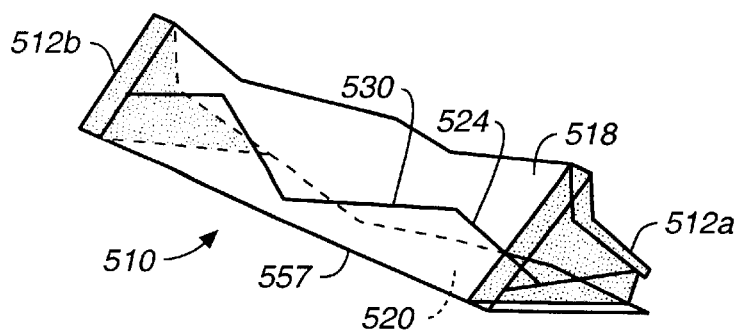
FIG._10B

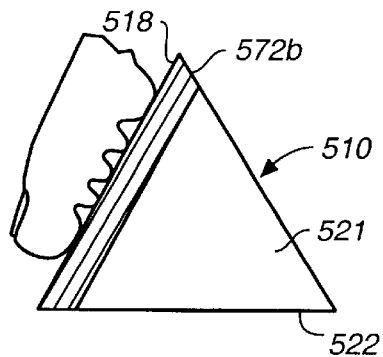
FIG._11
(FOURTH EMBODIMENT)
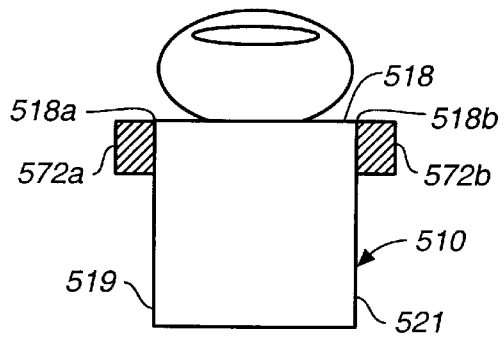
FIG._12
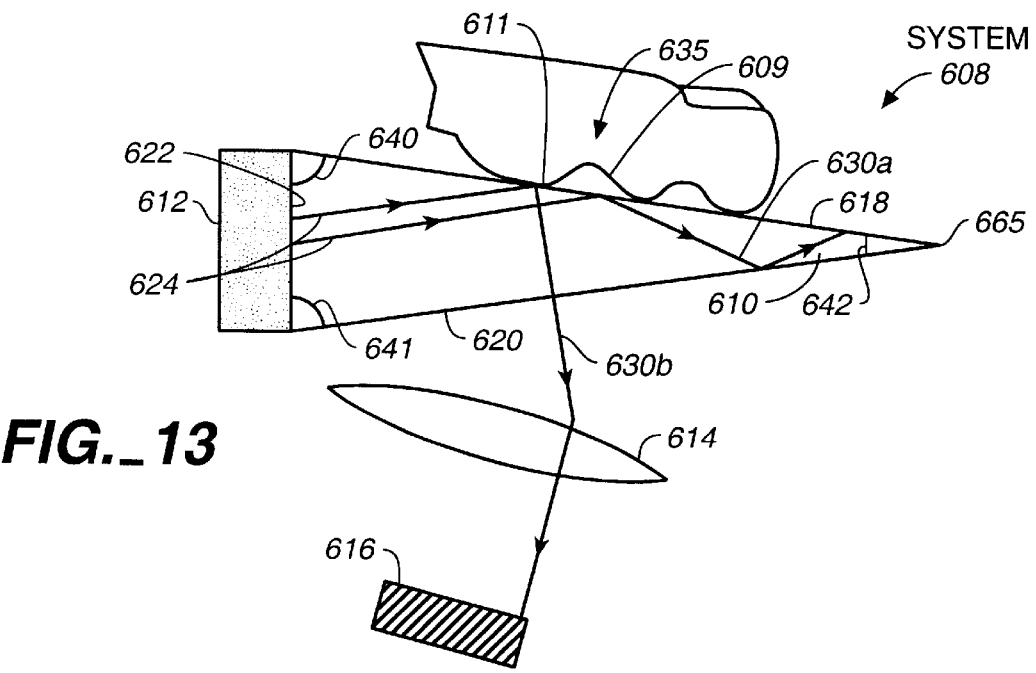
FIG._13
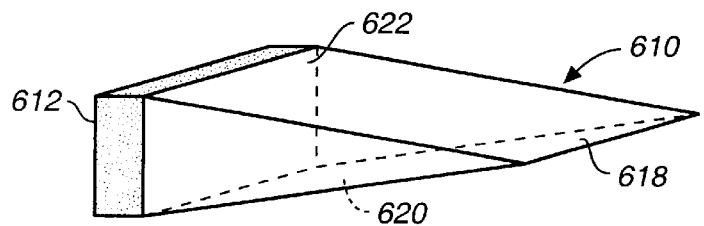
FIG._14

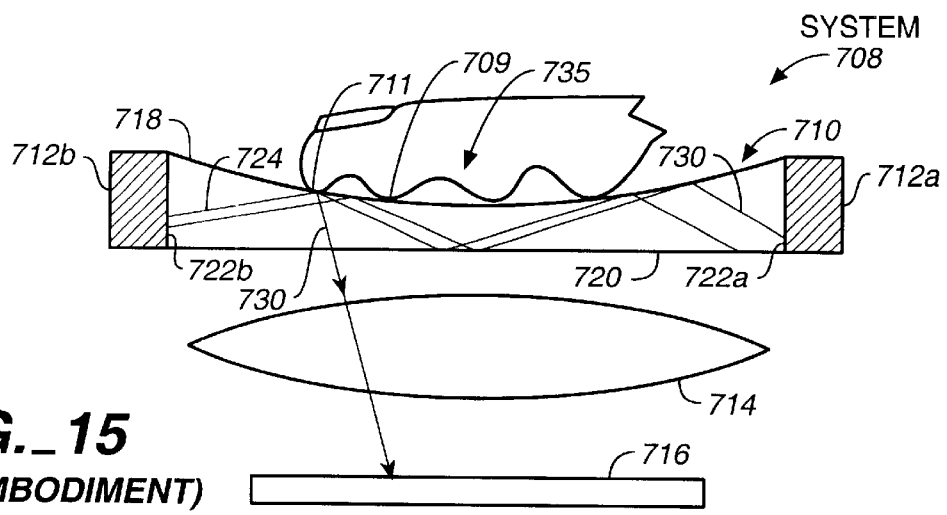
FIG._15
*(SIXTH EMBODIMENT)*
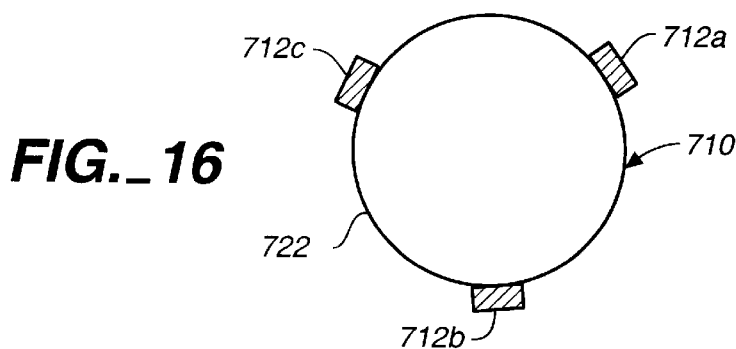
FIG._16
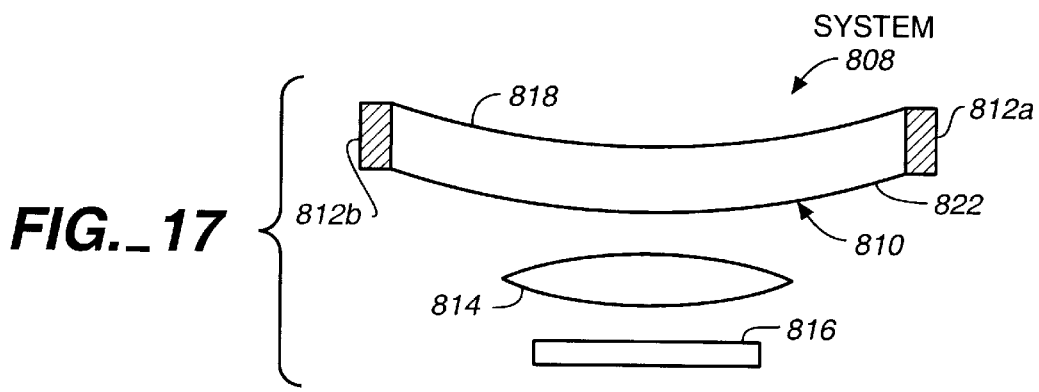
FIG._17
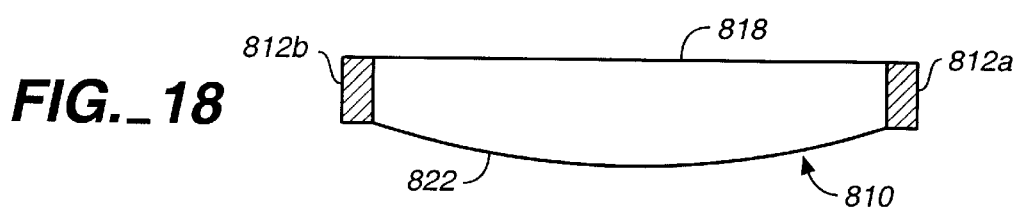
FIG._18

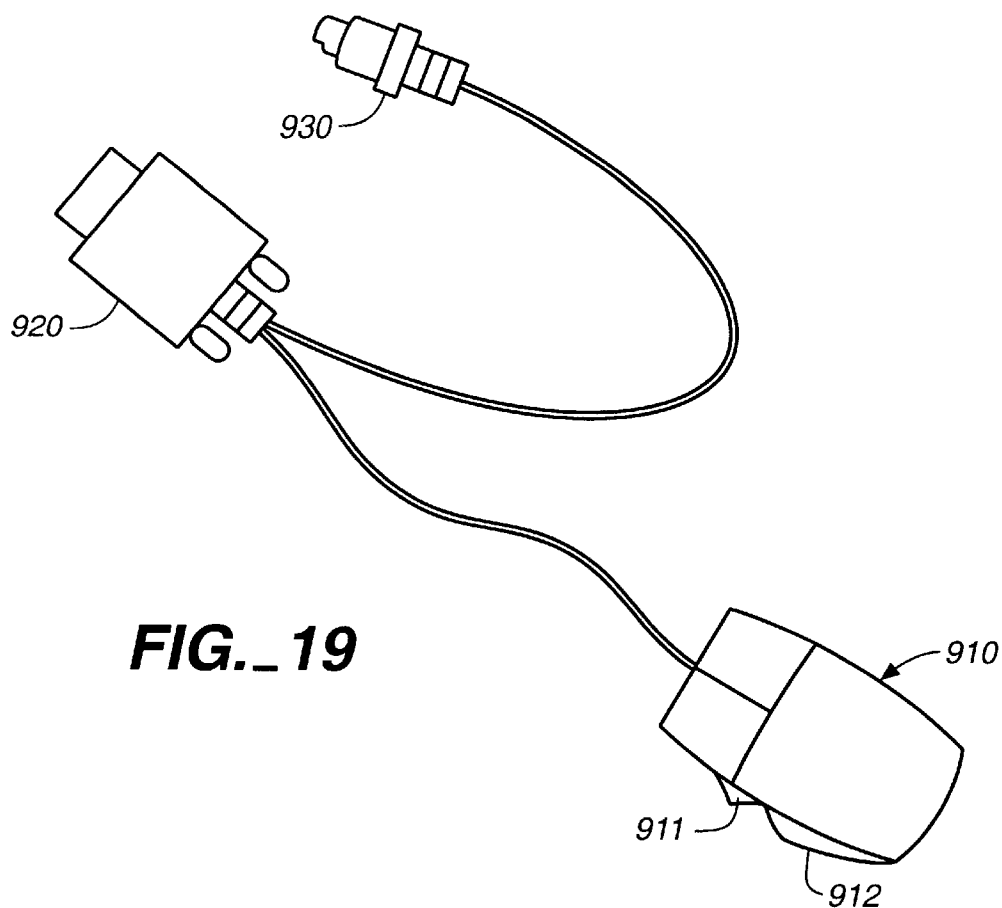
FIG._19
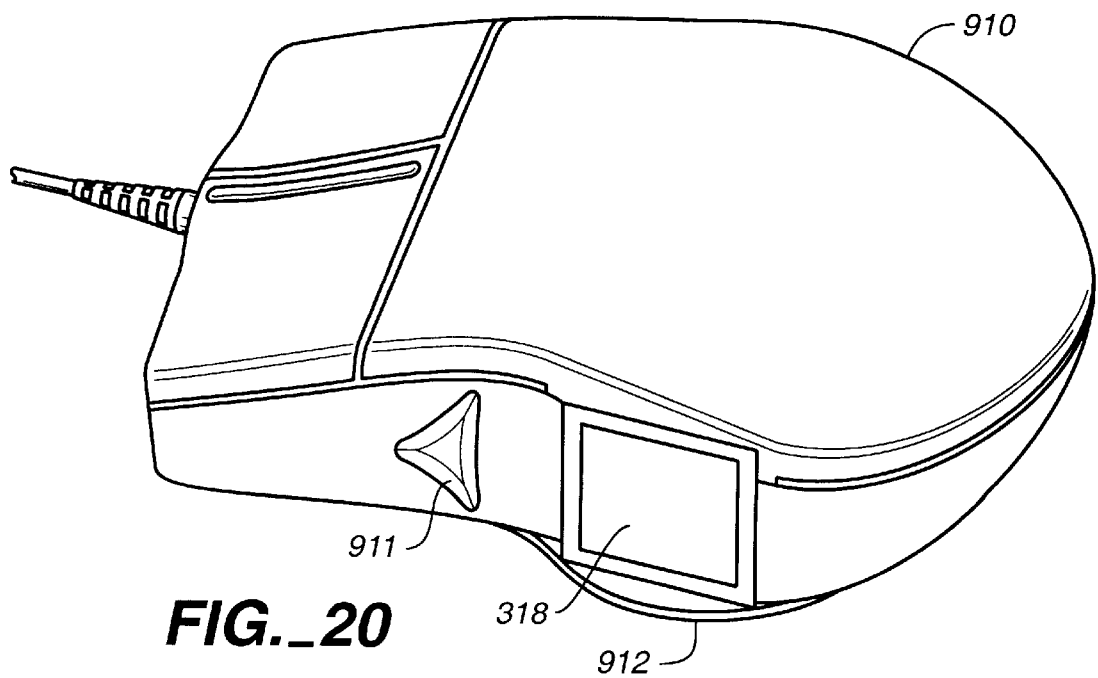
FIG._20

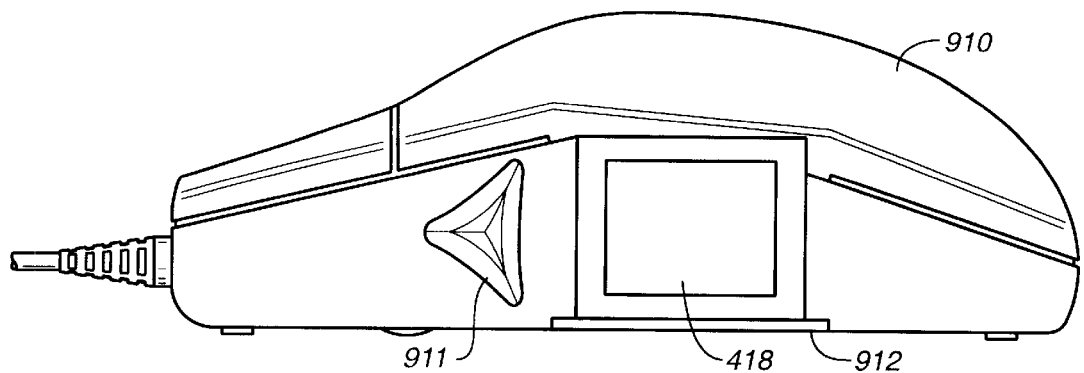
FIG._21
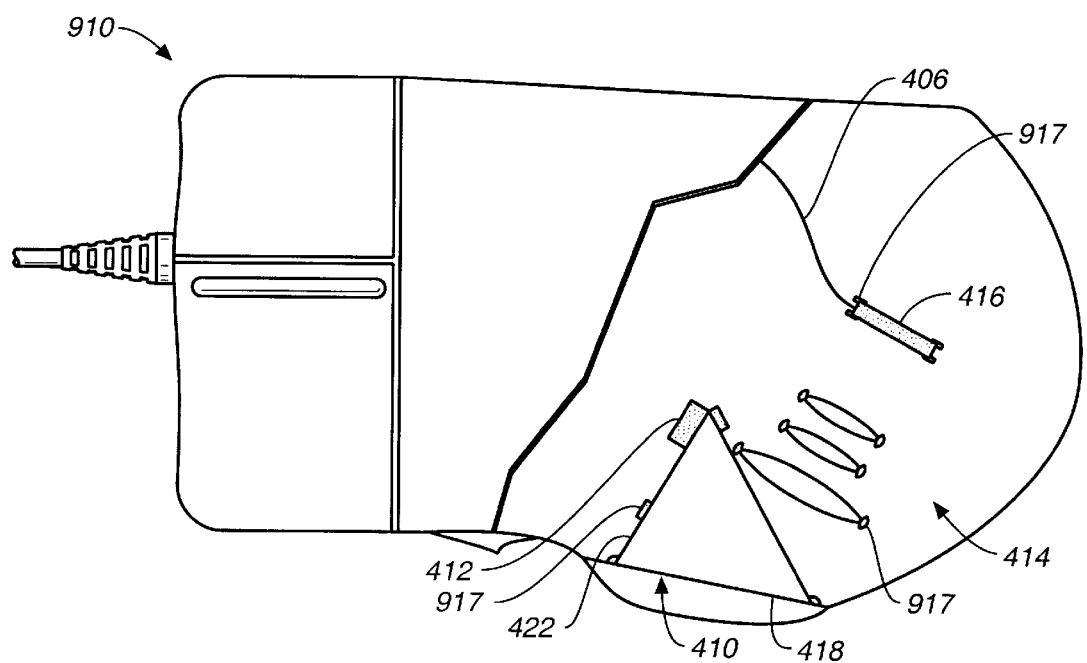
FIG._22

HIGH CONTRAST, LOW DISTORTION OPTICAL ACQUISTION SYSTEM FOR IMAGE CAPTURING

FIELD OF THE INVENTION

The present invention relates to an optical acquisition apparatus for use with an image capturing and recognition system. In particular, the present invention includes an optical acquisition apparatus for obtaining high contrast, low distortion images of patterned objects.

DESCRIPTION OF THE RELATED ART

Patterned object recognition systems are becoming common in industrial and commercial settings and have a variety of uses. For example, such systems can be used in scanners for the scanning of text, drawings, and photographs. Recently, manufacturers have been attempting to reduce costs associated with pattern recognition systems to make them more viable for consumer use. One such consumer application for pattern recognition systems includes fingerprint acquisition and recognition. Such a system is useful, for example, to enhance computer security by reading a potential user's fingerprint to compare with the fingerprints of users authorized to use the computer or access certain files or functions of the computer. Such a system could, for example, take the place of a security system that uses a login name and password.

The first thing such a fingerprint recognition system, or any pattern recognition system, must be able to do is to accurately acquire the fingerprint, or other pattern, for analysis. A number of mechanisms exist for such acquisition of pattern data. For example, U.S. Pat. No. 3,975,711; 4,681,435; 5,051,576; 5,177,435 and 5,233,404 all disclose apparatuses for acquiring an image of a patterned object.

FIG. 1 shows a schematic diagram of one such prior art optical fingerprint capturing and recognition system. In FIG. 1, an optical recognition system 108 includes an light source 112, an optical triangular prism 110, a lens assembly 114, an image sensor 116, and a storage and processing unit 125. The prism 110 includes an imaging surface 118, a light receiving surface 120, and an viewing surface 122. Imaging surface 118 is the surface against which a patterned object, such as a fingerprint, is placed for imaging. The light source 112, which may, for example, be a light emitting diode (LED), is placed adjacent to light receiving surface 120 and generates incident light 124 that is transmitted to the optical prism 110. The optical prism 110 is an isosceles right triangle, with the angle opposite the imaging surface 118 being approximately 90 degrees and the other two "base" angles (that is, the two angles of an isosceles prism that are equal) each being approximately 45 degrees.

Generally, incident light 124 strikes imaging surface 118 at an angle 126 with the incident surface normal line 115. Angle 126 is greater than the critical angle 128. In general, a critical angle is measured between an incident light ray and a normal line to a surface. Above the critical angle, the incident light will undergo total internal reflection off the surface, and below the critical angle the incident light will pass through the surface. Accordingly, critical angle 128 is the angle with the normal line to the imaging surface 118 above which incident light will totally internally reflect from imaging surface 118 and pass out of prism 110 as reflected light 130 through viewing surface 122. Reflected light 130 passes through lens assembly 114 located adjacent to viewing surface 122. Lens assembly 114 may contain one or more optical lenses. Thereafter, light from lens assembly 114 is captured by image sensor 116. Image sensor 116, which may, for example, be a charge coupled device (CCD) or a complementary metal oxide semiconductor (CMOS) device, captures optical light images and converts them to electrical signals. Such image sensors are well known to those skilled in the art. The electrical signals are then transmitted to the storage and processing unit 125.

Storage and processing unit 125 may include a memory unit, a processor and an analog to digital converter (not shown). The analog to digital converter converts the analog electrical signals from the image sensor 116 into digital data. The memory is used to store the digital data and algorithms for comparing a captured fingerprint image with a stored fingerprint image. The processor compares the captured digital data with data previously stored in memory based on an algorithm for comparing such data. The processor may also analyze the captured digital data for purposes different from comparison with stored data. Such storage and processing units are known to those skilled in the art and can include standard personal computers equipped with appropriate software. Algorithms for processing and comparison of image data are disclosed, for example, in U.S. Pat. Nos. 4,135,147 and 4,688,995 each of which is incorporated in its entirety by reference.

When a fingerprint is placed on the optical prism's imaging surface 118, ridges 111 of the fingerprint contact imaging surface 118, and valleys 109 of the fingerprint remain out of contact with imaging surface 118. Thus, in fingerprint valleys 109 incident light 124 entering the optical prism 110 from the light source 112 undergoes total internal reflection at imaging surface 118 if the incidence angle of the incoming light exceeds the critical angle of the optical prism 110. However, at ridges 111 of a fingerprint some of incident light 124 is absorbed and scattered off the fingerprint ridge. As used herein, the term "scattered" indicates light which, after striking an irregular surface, is radiated or irregularly reflected off the irregular surface in multiple directions.

As a result of this scattering and/or absorption, there is less than total internal reflection of incident light 124 at fingerprint ridges 111. Thus, the intensity of reflected light 130 leaving prism 110 from the valleys 109 of a fingerprint is of greater intensity than reflected light 130 leaving prism 110 from ridges 111. The lower intensity reflected light 130 from ridges 111 translate into darker regions to indicate the presence of an object at the point of incidence between the light beam and the fingerprinting surface. Conversely, higher intensity reflected light 130, such as that which undergoes total internal reflection, translates into brighter regions to indicate the absence of an object at the point of incidence between the incident light 124 and the imaging surface 118. This allows distinguishing the darker fingerprint ridges 111 from the relatively brighter fingerprint valleys 109. Because absorption of incident light at fingerprint ridges 111 is primarily responsible for creating a fingerprint image, system 108 is referred to as an "absorption" imaging system.

The above described system allows capturing an optical fingerprint image and processing the electrical representation of the optical fingerprint image. However, in regions of fingerprint ridges 111, incident light 124 still undergoes some total internal reflection and some scattering in a direction parallel to reflected light 130. Thus, the difference in intensity between reflected light 130 from fingerprint valleys 109 and fingerprint ridges 111 can be relatively low. That is, the contrast between fingerprint ridges 111 and valleys 109 in the fingerprint image can be relatively low. This can make image acquisition, processing, and comparison relatively difficult.

Additionally, the optical recognition system 108 tends to be relatively large due to the relatively large distance between the optical prism 110 and the lens assembly 114. The large distance between the optical prism 110 and the lens assembly 114 is caused by the fact that a fingerprint in imaging surface 118 is likely to be larger than the first lens in lens assembly 114. Thus, if lens assembly 114 is placed relatively close to viewing surface 122, lens assembly 114 will probably not capture the fingerprint image at points near the edges of the fingerprint. Therefore, a relatively large distance between the optical prism 110 and the lens assembly 114 is desirable in system 108 because it can provide better imaging near fingerprint edges. Thus, making image acquisition system 108 relatively compact can be problematic. Additionally, a relatively large distance between viewing surface 122 and lens assembly 114 can cause loss of contrast in the fingerprint image due to light interference.

Further, a phenomenon known as trapezoidal distortion can occur in pattern acquisition system 108. Trapezoidal distortion in an imaging system has the effect of making the image of a square created by the system appear as a trapezoid. FIG. 2 is a schematic illustration showing why trapezoidal distortion arises in image acquisition system 108. Incident light 124 from light source 112 enters prism 110 and reflects off of imaging surface 118, imaging object AB. Reflected light 130 then passes out of viewing surface 122 and to lens assembly 114 at points A' and B' to form object A'B'. Viewing object AB through viewing surface 122, object AB would appear to be located at an "apparent image" object ab. Specifically, point A appears to be at point a, a distance aa' from viewing surface 122 and point B appears to be at point b, a distance bb' from viewing surface 122. The distance that an apparent image of an object appears from viewing surface 122 is given by the actual distance the object is from viewing surface 122 divided by the index of refraction n of prism 110. Specifically, the distance aa' is given by:

$$aa'=Aa'/n,$$

where "n" is the index of refraction of prism 110. Similarly, $$bb'=Bb'/n.$$

Trapezoidal distortion occurs when the light path length from the apparent image of an object to the lens plane of lens assembly 114 is different for different parts of the imaged object. Specifically, trapezoidal distortion occurs in system 108 because the distance aA' is longer than the distance bB'. As the above equations make clear, trapezoidal distortion can only occur when light is passed through an object having an index of refraction that does not equal 1 (assuming the object is in air having an index of refraction of n=1).

To correct this distortion, prior art manufacturers have tilted the lens plane 107 of lens assembly 114 and image sensor 116 to increase the distance bB' and decrease the distance aA' to a point where the two distances are approximately equal. However, it is a property of an isosceles right prism (that is, a triangular prism in which the base angles measure approximately 45 degrees and the non-base angle, or apex angle, measures approximately 90 degrees), that reflected light 130 exits prism 110 substantially normal to viewing surface 122. That is, no refraction of reflected light 130 occurs as it exits viewing surface 122. Further, generally, the larger the angle of incidence on a surface of a transparent object, the greater the portion of incident light that is reflected from the surface. Thus, while tilting lens assembly 114 can reduce trapezoidal distortion, it also causes greater reflection of reflected light 130 off of the surface of lens assembly 114, and the surface of image sensor 116, because reflected light 130 strikes lens assembly 114 at a greater angle of incidence. This reduces the intensity of light entering image sensor 116, making image processing and comparison more difficult.

Additionally, the relative placement of light source 112 and lens assembly 114 make it possible for stray light 113 emitted by light source 112 to enter lens assembly 114. This can generate additional background "noise" light which can further reduce the quality of an captured image and make image processing more difficult.

To overcome some of the difficulties associated with the type of absorption image acquisition system described above, acquisition systems have been designed which are based primarily on scattering mechanisms rather than absorption mechanisms. One such acquisition system is disclosed by U.S. Pat. No. 5,233,404 issued to J. Lougheed et al. on Aug. 3, 1993 (Lougheed et al.). FIG. 3 is a schematic diagram illustrating the image acquisition portion of the apparatus disclosed by Lougheed et al. As shown in FIG. 3, a prior art image acquisition system 208 includes a trapezoidal prism 210, a light source 212, a lens assembly 214 and an image sensor 216. The trapezoidal prism 210 includes at least an imaging surface 218, a light receiving surface 220, and a viewing surface 222.

The imaging surface 218 is the surface against which an object to be imaged, such as a fingerprint, is placed. The light source 212 is located adjacent to and facing the light receiving surface 220 which is substantially parallel to imaging surface 218. Thus, incident light 224 emitted by light source 212 projects light through prism 210 and onto imaging surface 218 at an angle which is generally less than the critical angle 228 of imaging surface 210. Therefore, in the valleys 209 of a fingerprint placed against imaging surface 218 where the fingerprint is not in contact with imaging surface, total internal reflection does not occur and incident light 224 passes through imaging surface 218. At points where fingerprint ridges 211 are in contact with imaging surface 218, incident light 224 strikes the fingerprint ridge to generate scattered (or equivalently, irregularly reflected) light 230. Scattered light 230 propagates back into prism 210 in substantially all directions including the direction of lens assembly 214, located adjacent to viewing surface 222. Scattered light passes through viewing surface 222 and into lens assembly 214 to be detected by image sensor 216, which, as above, can be a CCD, CMOS or other type of detector.

In the region of a fingerprint valley 209, incident light 224 passes through imaging surface 218. And, in the area of a fingerprint ridge 211, incident light 224 scatters off imaging surface 218 to be picked up by lens assembly 214 and image sensor 216. Accordingly, the image of the fingerprint is relatively bright at fingerprint ridges 211 and relatively dark at fingerprint valleys 209. Because scattered light 230 is picked up by the image sensor 216, this type of system is referred to as a "scattering" system.

The difference in intensity between the ridges and valleys in a fingerprint image created by such a scattering system can be greater than the difference in intensity between the ridges and valleys of a fingerprint image created in an absorption system as shown in FIG. 1. As a result, the fingerprint image created by such a scattering system can display higher contrast between fingerprint ridges and valleys than an image created by an absorption system. Thus, the image can be more accurately acquired by the image sensor 216. This can reduce errors in subsequent fingerprint comparisons performed by the system. However, a trapezoidal prism such as prism 210 can be more expensive to manufacture than a triangular prism such as prism 110, shown in FIG. 1. This is because, among other reasons, there is an extra surface to polish. This can increase the price of an imaging system such as imaging system 208, making it less viable for consumer use. Further, a trapezoidal prism such as prism 210 which is large enough to be used for fingerprint imaging can be larger than a similarly suited triangular prism. Thus, use of a trapezoidal prism such as prism 110 can cause an imaging system to be relatively less compact.

Additionally, image acquisition system 208 can cause trapezoidal distortion of a fingerprint image in a manner similar to that of image acquisition system 108. This is especially the case if imaging surface 218 and viewing surface 222 form an angle with each other of approximately 45 degrees. If this is the case, then image acquisition system 208 will cause trapezoidal distortion for the same reasons, discussed above, that image acquisition system 108 does. Such an image acquisition system using a trapezoidal prism having a 45 degree angle between the imaging surface and viewing surface is disclosed, for example, in U.S. Pat. No. 5,210,588.

As the above discussion makes clear, there is a need for improved image acquisition apparatus for use with patterned object recognition systems. Specifically, an image acquisition apparatus that produces a high contrast, low distortion image would be desirable. Additionally, the apparatus should be relatively compact. Also, the apparatus should be relatively low cost to manufacture, making it affordable for consumer use.

SUMMARY OF THE INVENTION

The present invention includes a compact image acquisition apparatus which produces a high contrast, low distortion image and which can be relatively low cost to manufacture. The apparatus includes a light refractor having an imaging surface against which a patterned object is to be placed, a light entrance surface, and a viewing surface. The light entrance surface is adjacent to the imaging surface and allows light to enter the refractor. The viewing surface is also adjacent to the imaging surface and an image of the patterned object is projected through the viewing surface. The apparatus also includes a focusing lens adjacent to the viewing surface for receiving and focusing an image of a patterned object. A light source is located adjacent to the light receiving surface and emits incident light which enters the refractor to create an image of the patterned object at the viewing surface. The focusing lens then focuses the image. The light source is positioned such that the light emitted therefrom strikes at least one other surface before striking the imaging surface. In this way, an image from the imaging surface and projected through the viewing surface is generated by substantially all scattered light. Such a scattered light image is advantageously relatively high contrast and evenly illuminated.

In a second aspect of the present invention, the refractor is an isosceles triangular prism having base angles which are greater than 45 degrees. Additionally, the lens plane of the focusing lens is tilted with respect to a plane defined by the viewing surface. In this way, trapezoidal distortion in an image of the patterned object is advantageously reduced.

In a third aspect of the present invention, an apparatus for forming an image of a patterned object includes a first lens, an objective lens or lens assembly, and a light source. The first lens includes an imaging surface against which a patterned object is to be placed, and a viewing surface opposite to the light entrance surface, through which an image of the object is projected. The first lens also includes a light receiving surface adjacent to the imaging surface. The apparatus further includes a light source for projecting incident light into the lens. The light source is located adjacent to the light entrance surface to project incident light between the imaging surface and the viewing surface. The incident light can undergo total internal reflection between the imaging surface and the viewing surface without passing through the viewing surface. In this way an image of the patterned object projected through the viewing surface is generated by substantially all scattered light. The apparatus also includes an objective lens or lens assembly adjacent to the viewing surface which focuses the image of the patterned object projected through the viewing surface.

The imaging surface of the first lens can be concave to better fit the contour of a fingerprint placed on the imaging surface. Additionally, the first lens and objective lens can be formed unitarily as a single piece. This can ease assembly, reduce manufacturing costs, and allow the image acquisition apparatus to be more compact.

In a fourth aspect of the present invention, an apparatus for forming an image of a patterned object includes a triangular prism, a focusing lens and a light source. The triangular prism includes an imaging surface, a light receiving surface adjacent to the imaging surface and a viewing surface adjacent to the light receiving surface. The lens is adjacent to the viewing surface and is for receiving and focusing an image of the patterned object. The light source is for projecting incident light into the triangular prism and is located adjacent to the light receiving surface to project light between the imaging surface and the viewing surface. Most of the incident light undergoes total internal reflection between the imaging surface and the viewing surface without passing through the viewing surface. In this way, an image of the patterned object projected through the viewing surface into the objective lens is generated by substantially all scattered light from the imaging surface.

In this fourth aspect of the present invention, a first light source can be placed on a first end triangular surface of the prism and a second light source can be placed on a second end triangular surface of the prism opposite to the first triangular end surface. This configuration advantageously provides even illumination of the imaging surface to generate a relatively uniform patterned object image.

A method of generating an image of a patterned object in accordance with the present invention includes providing a light refractor having an imaging surface, a light receiving surface and a viewing surface. A patterned object is placed against the imaging surface. Incident light is projected from a light source through the light receiving surface of the light refractor and reflected off at least one surface of the refractor other than the imaging surface before the incident light strikes the imaging surface. The incident light is scattered off the imaging surface and patterned object and through the viewing surface. A lens is provided adjacent to the viewing surface and the scattered light is projected into the lens which focuses the scattered light to form an image of the patterned object.

BRIEF DESCRIPTION OF THE DRAWINGS

FIG. 1 is a schematic of a prior art image acquisition apparatus which utilizes an absorption image acquisition technique.

FIG. 2 is a schematic of the image acquisition apparatus of FIG. 1 illustrating trapezoidal distortion.

FIG. 3 is a schematic of a second prior art image acquisition apparatus which utilizes a scattering image acquisition technique.

FIG. 4 is a schematic diagram of an image acquisition system including a prism, light source, lens assembly, and image sensor, in accordance with the present invention and wherein the viewing surface of the prism includes the light receiving surface thereof.

FIG. 5 is a perspective view of the prism and light source shown in FIG. 4.

FIG. 6A is a schematic diagram of the image acquisition system shown in FIG. 4 illustrating how trapezoidal distortion is reduced.

FIG. 6B is a schematic diagram showing a lens assembly which can be used with the image acquisition system shown in FIG. 4.

FIG. 7 is a schematic diagram of a second embodiment of an image acquisition system including a prism, light source, lens assembly, and image sensor in accordance with the present invention and wherein the viewing surface of the prism is adjacent to the light receiving surface.

FIG. 8 is a schematic diagram of a third embodiment of an image acquisition system including a prism and light sources in accordance with the present invention and wherein a light source is adjacent to each triangular end face of the prism.

FIG. 9 is a perspective view of the prism and light sources shown in FIG. 8.

FIG. 10A is a front view of the prism and light source shown in FIG. 8.

FIG. 10B is a partial perspective view of the prism and light sources shown in FIG. 8.

FIG. 11 is a schematic diagram of a fourth embodiment of a partial image acquisition system including light sources and a prism in accordance with the present invention and wherein each light source includes a strip light source adjacent to a triangular end face of the prism.

FIG. 12 is an end view of the prism and light source shown in FIG. 11.

FIG. 13 is a schematic diagram of a fifth embodiment of an image acquisition system including a prism, light source, lens assembly, and image sensor in accordance with the present invention and wherein incident light undergoes total internal reflection.

FIG. 14 is a perspective view of the prism and light source shown in FIG. 13.

FIG. 15 is a schematic diagram of a sixth embodiment of a light acquisition system including a first lens, a lens assembly, a light source and an image sensor in accordance with the present invention.

FIG. 16 is a top view of the first lens and light source shown in FIG. 15.

FIG. 17 is a schematic diagram of a seventh embodiment of an image acquisition system including a lens assembly, a light source and an image sensor in accordance with the present invention.

FIG. 18 is schematic diagram of an alternate embodiment of the lens shown in FIG. 17 in accordance with the present invention.

FIG. 19 is a top view of a computer mouse and computer connection cables therefore, the mouse for housing an image acquisition system in accordance with the present invention.

FIG. 20 is a perspective view of the computer mouse shown in FIG. 19.

FIG. 21 is a side view of the computer mouse shown in FIG. 19.

FIG. 22 is a top, partially cut away view of the computer mouse shown in FIG. 19 housing an image acquisition system in accordance with the present invention.

DETAILED DESCRIPTION

FIGS. 4 and 5 show a patterned object image acquisition system 308 in accordance with the present invention. Acquisition system 308 preferably includes a triangular prism 310, a light source 312, a lens assembly 314, and an image sensor 316. Prism 310 is a five faced isosceles triangular prism the length of which extends into the plane of FIG. 4. Prism 310 includes a rectangular imaging surface 318 against which an object to be imaged, such as a fingerprint 335, is placed. Prism 310 also includes a rectangular viewing surface 320 through which an image of a fingerprint 335 placed against imaging surface 318 passes out of prism 310. In the embodiment of FIGS. 4 and 5, viewing surface 320 also serves as a light receiving surface for allowing light to pass into prism 310. A light scattering surface 322 of prism comprises a third rectangular surface of prism 310. For reasons detailed below, light scattering surface 322 is preferably a diffusive.

Light source 312 is preferably an elongated LED array consisting of a single row of light emitting diodes (LEDs) extending the length (into the plane of FIG. 4) of prism 310. If such LEDs are used as light source 312, a diffusive cover can be placed between the LEDs and viewing surface 320 to provide more even illumination of imaging surface 318. It is also within the ambit of the present invention, however, for light source 312 to be any other type of light source to provide incident light into prism 310. Preferably, light source 312 is placed along an edge 338 of prism 310 which is opposite imaging surface 318.

Lens assembly 314 is for receiving scattered light 330 from fingerprint 335 and focusing scattered light 330 onto image sensor 316. Lens assembly 314 can be a single lens or, preferably, can consist of multiple lenses. Most preferably, lens assembly 314 has a focal length of approximately 13.48 mm and is located approximately 13.5 mm from viewing surface 320. Additionally, as shown in FIG. 6B which is a schematic diagram of one embodiment of lens assembly 314, lens assembly most preferably consists of three lenses 904, 906, and 908 whose respective optical axes are aligned on a common optical axis 902. Lens 904 most preferably has a diameter of approximately 17.8 mm, and both lenses 906 and 908 most preferably have a diameter of approximately 6 mm. It is considered that any number of lenses be included in lens assembly 314.

Image sensor 316 captures optical light images from lens assembly 314 and converts them to electrical signals. Image sensor 316 can be a charge couple device ("CCD") or any other means of converting a light signal into either an analog or digital electrical signal. Preferably, image sensor 316 is a complementary metal oxide semiconductor device. CCD and CMOS image sensors are well known by those skilled in the art. The electrical signals generated by image sensor 316 can be processed using known means and used to compare input patterns, such as fingerprints. As noted in the Background section, such signal processing means are disclosed, for example, in U.S. Pat. Nos. 4,135,147 and 4,688,995, which have been incorporated by reference.

To create an optical image of fingerprint 335 on image sensor 316, fingerprint 335 is placed against imaging surface 318. Incident light 324 from light source 312 passes through viewing surface 320 and into prism 310. Because light source 312 is located adjacent to edge 338, incident light 324 strikes scattering surface 322. As noted above scattering surface 322 is preferably diffusive. As such, a relatively high portion of incident light 334 striking scattering surface 322 is internally scattered in prism 310. This scattered light then strikes imaging surface 318. Even if light scattering surface 322 is not diffusive, substantially all of incident light 324 will strike scattering surface 322 at an angle 323 which is greater than the critical angle for scattering surface 322. Thus, incident light will reflect off scattering surface 322 and strike imaging surface 318. To enhance reflection of incident light off of scattering surface 322 it is contemplated to place a mirrored face of a reflecting surface 381 towards scattering surface 322.

Because incident light 324 has been scattered or directly reflected off of scattering surface 322, a relatively large percentage of incident light 324 will strike imaging surface 318 at an angle 327 less than the critical angle 328 of imaging surface 318. Accordingly, incident light 324 which strikes imaging surface 318 at a region thereof where there is a fingerprint valley 309 will not undergo total internal reflection and will substantially pass through imaging surface 318 such that substantially no light hitting an area of imaging surface 318 where there is a fingerprint valley 309 will be directed through imaging surface 322. However, incident light 324 that strikes a region of imaging surface 318 where there is a fingerprint ridge 311 touching imaging surface 318 will substantially scatter, producing scattered light 330. A portion of scattered light 330 will exit prism 310 via viewing surface 320. Upon exiting prism 310, scattered light 330 will diffract into lens assembly 314 which will focus scattered light 330 into image sensor 316.

Because incident light 324 can be scattered by scattering surface 322, incident light 324 provides relatively uniform illumination over imaging surface 318 which produces a relatively uniform image. Such a uniform image is desirable because it is easier to process and compare with other stored fingerprint data. To further increase the uniformity of illumination over imaging surface 318, the portion of viewing surface 320 facing light source 312 can be streaked by etching lines 370, shown in FIG. 5, in viewing surface 320. Lines 370 run the length of prism 310 and parallel to apex 338. Lines 370 act to diffuse light emitted from light source 312 as is passes through viewing surface 320. As noted above, this diffusion enhances the uniformity of illumination over imaging surface 318.

In addition to the components discussed above, image acquisition system 308 preferably also includes a light blocking shield 350 on a portion of light receiving surface adjacent to light source 312. Preferably, light blocking shield runs the entire length of prism 310 (into the plane of FIG. 4). Light blocking shield 350 is to reduce the amount of stray light from light source 312 which might enter lens assembly 314 and interfere with or cloud a fingerprint image. It is also considered that the surface of light blocking shield 350 facing the interior of prism 310 be mirrored. This mirroring can act to desirably increase the intensity of scattered light incident on imaging surface 318. In addition to, or instead of, light blocking surface 350, a second light blocking surface 352 can be placed between light source 312 and lens assembly 314. Light shield 352 preferably extends from viewing surface 320 at an angle to block stray light from light source 312 from entering lens assembly 314.

Because light source 312 is relatively narrow and located adjacent to edge 338 opposite from imaging surface 318, substantially all incident light 324 reaching imaging surface 318 is reflected or scattered off of scattering surface 322. That is, almost no incident light 324 strikes imaging surface 318 directly from light source 312. To further reduce the likelihood of incident light 324 directly striking imaging surface 318, light source 312 is preferably configured not to extend past a line 360, shown in FIG. 5, extending the length of prism 310 and defined by the intersection of a plane normal to viewing surface 320 and intersecting with edge 365, adjacent to imaging surface 318. If light source 312 is kept on the same side of this line as apex 338, then substantially no incident light 324 emitted perpendicularly from light source 312 will directly strike imaging surface 318.

By minimizing incident light 324 from light source 312 that is directly incident on imaging surface, there is substantially no total internal reflection of incident light 324 it from regions of imaging surface 318 where there are fingerprint valleys 309. This means that relatively little light from these valley regions passes through viewing surface 320 and into lens assembly 314. Rather, substantially all the light passing into lens assembly 314 from imaging surface 318 is scattered from fingerprint ridges 311 on imaging surface 318. This provides a fingerprint image having relatively high contrast between fingerprint ridges 311 and valleys 309. Such a high contrast fingerprint image is relatively easy to process and compare with other fingerprint images and can, therefore, advantageously increase processing accuracy.

Further, use of this scattering technique for image acquisition is achieved with a triangular prism, as opposed to a trapezoidal prism as disclosed in Lougheed, discussed in the Background section. Because triangular prisms can be more efficient to manufacture than trapezoidal prisms, image acquisition system 308 can advantageously be relatively less expensive to manufacture.

Moreover, scattered light generally scatters from an object in many directions, as opposed to substantially one direction. Thus, scattered light from an object can be picked up and focused by a lens over a wide range of distances without any significant degradation in quality of the image near the edges of the image. Accordingly, lens assembly 314 can be placed relatively close to viewing surface 320 without significant loss of image quality. This advantageously allows the image acquisition system 308 to be relatively compact.

Additionally, the image acquisition system of the current invention can reduce trapezoidal distortion. As discussed in the Background section, trapezoidal distortion is manifested in an image having dimensions distorted from those of the actual object being imaged. Trapezoidal distortion is caused by variation in path length of light from the apparent image of an object to lens assembly 314 from one part of the imaged object to another. As shown in FIG. 6A, however, in image acquisition system 308, the path length of scattered light 330 from different points on the apparent image 335' of fingerprint 335 to lens assembly 314 is substantially the same. Specifically, path AA' is substantially equal to path BB' and path CC'. Thus, trapezoidal distortion can advantageously be reduced. As shown in FIG. 6A, substantial equalization of paths AA', BB' and CC' is facilitated by tilting lens assembly 314 with respect to viewing surface 320. However, unlike image acquisition system 108, shown in FIG. 1, such tilting of lens assembly 314 does not reduce the intensity of the image reaching image sensor 316. As noted in the background section with respect to image acquisition system 108, tilting lens assembly 114 causes reflected light 130 to strike the first element of lens assembly 314 at an angle to normal line thereof. This causes greater reflection of reflected light 130 from the surface of lens assembly 114, thereby undesirably reducing image intensity at image sensor 116.

However, as noted above, prism 310 is an isosceles prism and preferably has base angles 340 and 341 which measure above 45 degrees. The base angle 340 is the angle at edge 365, between imaging surface 318 and scattering surface 322, and base angle 341 is the angle at edge 338, which is opposite to imaging surface 318. Further, prism 310 preferably has an index of refraction not equal to 1. Thus, scattered light 330 which strikes viewing surface 320 refracts away from the normal to viewing surface 320 as it exits prism 310. As such, by tilting the lens plane 307 of lens assembly 314, scattered light 330 strikes lens assembly 314 at substantially 90 degrees. Thus, there is no loss in image intensity due to undue reflection of scattered light at the surface of lens assembly 314, and trapezoidal can be reduced without loosing image intensity at image sensor 316. Preferably, base angles of prism 310 at edges 365 and 338 preferably measure between 50 and 65 degrees inclusive and most preferably measure either 62 degrees or 63 degrees. If prism 310 has base angles of approximately 62 degrees, the index of refraction of prism 310 is preferably between 1.71 and 1.72 and most preferably approximately 1.713. If prism 310 has base angles of approximately 63 degrees, prism 310 preferably has an index of refraction of between 1.68 and 1.70, and most preferably approximately 1.6935 or 1.6968. However, it is contemplated that prism 310 have any index of refraction higher than 1.

Prism 310 can be made of glass, acrylic or any other transparent material having an index of refraction different from 1 (that of air). Prisms having the preferred index of refraction and angles are commercially available from Shinkwang Ltd. of Seoul, Korea and are fabricated of glass having the designation LaK-7 or LaK-8.

Lens assemblies such as lens assembly 314 are commercially available from Seoul Optical Systems Ltd. of Seoul, Korea and are preferably fabricated from a glass having the commercial designation of BK7. If more than one element is used in lens assembly 314, as shown in FIG. 6A, the individual elements can be aligned and spaced by placing them in a frame fabricated by plastic molding or any other fabrication means as is known in the art.

Light source 312 preferably consists of four standard LEDs positioned in a straight array on a circuit board. Powering of LEDs is well known by those skilled in the art. Image sensor 316 is preferably a CMOS type sensor and is commercially available from Hyudai Electronics of Seoul, Korea, VLSI Vision, Ltd. of San Jose, Calif., or Omnivision Technologies Inc. of Sunnyvale, Calif.

To secure the components of image acquisition into the relative positions as shown in FIG. 4, a frame having holding slots for each component can be plastic molded or otherwise fabricated. Light source 312 can be either placed in a holding slot adjacent to viewing surface 320 or attached direction to viewing surface 320 using translucent adhesive as known in the art.

In the embodiment of the present invention shown in FIGS. 4–6, light source 312 is located adjacent to viewing surface 320 which is also the light receiving surface. However, it is within the scope of the present invention to move light source 312 to other surfaces of the triangular prism. One such embodiment wherein the light source is located adjacent to a surface other than the viewing surface, is illustrated in FIG. 7. As shown, a image acquisition system 408 includes an isosceles triangular prism 410, a light source 412, a lens assembly 414, and a image sensor 416. As with prism 310 of image acquisition system 308, prism 410 includes an imaging face 418 against which a fingerprint 435 is placed, and a viewing surface 420 through which an image of fingerprint 435 is projected onto lens assembly 414.

However, as shown, light source 412 is placed adjacent to a light receiving surface 422, which is different from viewing surface 420. Light source 412 is a relatively narrow light source and can be, for example, a single row of LEDs. Light source 412 is preferably placed directly adjacent to edge 448, opposite viewing surface 418 and runs the length of prism 418 (into the plane of FIG. 7). As with light source 312 of image acquisition system 308, preferably, no part of light source 412 crosses a line in light receiving surface 422 defined by the intersection light receiving surface 422 and a plane which is normal to light receiving surface 422 and intersects edge 465 opposite to light receiving surface 422.

Incident light 424 from light source 412 passes through light receiving surface 422 and strikes viewing surface 420. Because the angle of incidence of a substantial portion incident light 424 on viewing surface 420 is greater than the critical angle for surface 420, incident light 424 will reflect or scatter off of surface 420 and strike imaging surface 418. At this point, the operation of image acquisition system 408 is substantially the same as that of image acquisition system 308. Incident light 424 strikes imaging surface at an angle less than the critical angle for imaging surface 418 projects an image of fingerprint 435 through viewing surface 420 and onto lens assembly 414. Lens assembly 414 then focuses this image onto image sensor 416.

As noted, incident light 424 scatters or reflects off of viewing surface 420 before striking imaging surface 418. This advantageously provides for relatively even illumination of imaging surface 418. Additionally, substantially all incident light 424 strikes imaging surface 418 at an angle which is less than the critical angle of imaging surface 418. Thus, as discussed above with respect to image acquisition system 308, the image of fingerprint 435 projected through viewing surface 420 is created by substantially all scattered light 430. This advantageously allows lens assembly 414 to be placed relatively close to viewing surface 420 without substantial image degradation and provides a relatively high contrast image of fingerprint 435.

As with image acquisition system 308, image acquisition system 408 can also include a light blocking shield 450 on viewing surface 420 running the length thereof (into the plane of FIG. 7) and adjacent to apex 438. The surface of light blocking shield 424 facing viewing surface 420 can be opaque, diffusive or mirrored. Additionally, or alternatively, image acquisition system 408 can include a second light blocking shield 452 extending running the length of viewing surface 420 and extending at an angle therefrom. Both light blocking shields 450 and 452 serve to prevent degradation of an image of fingerprint 435 by diminishing the amount of stray light from light source 412 which might enter lens assembly 414.

Further, as with image acquisition system 308, the surface of light receiving surface 422 in the region where light source 412 faces light receiving surface 422, can be streaked with lines running the length of surface 422 and parallel to apex 438. Such lines serve to make incident light 424 more diffuse. As explained above, this provides for more even illumination of imaging surface 418.

Moreover, isosceles prism 410 preferably includes base angles 440 and 441 which are greater than 45 degrees. More preferably, base angles 440 and 441 are between 50 and 65 degrees, inclusive, and most preferably measure either 62 degrees or 63 degrees. Also, index of refraction of prism 410 is preferably greater than 1.5. As such, when scattered light 430 passes through viewing surface 420, scattered light 430 will refract away from a line normal to viewing surface 420. Thus, as shown in FIG. 7, the lens plane of lens assembly 414 can be tilted with respect to viewing surface 420 to advantageously reduce trapezoidal distortion and scattered light 430 will still enter lens assembly 420 substantially normal to the lens plane. Thus, as with image acquisition system 308, the intensity of the image of fingerprint 435 can remain relatively high.

The components of image acquisition system 408, including prism 410, light source 412, lens assembly 414 and image sensor 416, can all be the same components as those of image acquisition system 308. Also, image system 408 can be fabricated in substantially the same manner as image acquisition system 308. In particular, to secure the components of image acquisition into the relative positions as shown in FIG. 7, a frame having holding slots for each component can be plastic molded or otherwise fabricated. Light source 412 can be either placed in a holding slot adjacent to light receiving surface 422 or attached direction to light receiving surface 422 using translucent adhesive as known in the art.

It is contemplated that the frame and holding slots discussed above be part of a standard computer user input device such as, for example, a keyboard, trackball or mouse. This is to allow the optical acquisition system of the present invention to be housed in such a device. FIGS. 19–22 show an embodiment of the present invention wherein an optical acquisition system, such as system 308 or 408, is housed in an otherwise conventional computer mouse.

FIG. 19 is a top view of a computer mouse 910 housing an optical acquisition system, such as acquisition system 408. Attached to mouse 910 is a parallel port connector 920 and a conventional computer mouse connector 930. It is also considered that mouse 910 include a serial port connector instead of a parallel port connector. As can be seen in FIGS. 20 and 21, which show a perspective view and a side view, respectively, of mouse 910, imaging surface 418 of prism 410 can be exposed on one edge of mouse 910. This allows a user to place a thumb or finger against imaging surface 418 when using mouse 910 to allow a fingerprint image to be captured by a computer to which mouse 910 is connected. FIG. 22 is a partially cut away, top view of mouse 910 showing image acquisition system 408 housed therein. As shown, image acquisition system 408 is held in place in mouse 910 by frames 917 retaining prism 410, lens assembly 414, and image sensor 416. Additionally, a signal conduit 406, which can be an electrical wire, runs from image sensor 416 to detection electronics (not shown).

As noted above, image acquisition system 308 can advantageously be made relatively compact. This facilitates placement of image acquisition system 308 in mouse 910. In a presently preferred embodiment, computer mouse 910 includes both a horizontal guide 911 and a vertical guide 912 for insuring that a finger whose fingerprint image is to be taken is properly aligned in the horizontal and vertical directions, respectively, with respect to imaging surface 318. In some embodiments of the computer mouse, use of only one of the horizontal and vertical guides may be sufficient for aligning the finger with the optical prism. In FIG. 21, vertical guide 912 is shown as being near the bottom of the computer mouse 910. In an alternative embodiment, vertical guide 912 may be located near the top of computer mouse 910 (or, equivalently, imaging surface 418) rather than the bottom as shown in FIG. 21.

As noted above, mouse 910 is coupled to a parallel connector 920 and a conventional computer mouse connector 930. The parallel connector 920 transmits fingerprint capture data from the optical structure to a computer to which the pointing device is coupled. The conventional mouse port connector transfers power and other signals related to conventional mouse operation, between the computer mouse 910 and a computer (not shown) to which the computer mouse 910 is coupled. The conventional mouse port connector 930 may be a PS/2 port connector. It is also contemplated that the mouse port connector 930 not be used and that only a universal serial bus connector be used in place of the parallel connector 920.

Although the above description has been made in relation to a computer mouse, it is to be noted that the optical structure of the present invention may be used in conjunction with numerous other devices. Specifically, the optical structure may be incorporated into telephones, televisions, cars, doors, and other items. The fingerprint image may be used as a security access key by the aforementioned items and may be used as a security access key or password for accessing a computer system, either upon booting the computer or when reentering a computer system from a screen saver.

Another embodiment of the present invention having the light source in yet a different location is shown in FIGS. 8–10. FIG. 8 is a side view of an image acquisition system 508 which, like image acquisitions systems 308 and 408, includes an isosceles triangular prism 510, a lens assembly 514, and a image sensor 516. As with prism 310 of image acquisition system 308, prism 510 includes an imaging face 518 against which a fingerprint 535 is placed, and a viewing surface 520 through which an image of fingerprint 535 is projected onto lens assembly 514. However, as can best be seen in FIGS. 9 and 10A, which are, respectively, a perspective view and a front view of prism 510, image acquisition system 508 preferably includes at least two separate light sources 512a and 512b each of which are placed over triangular end surfaces 519 and 521 (shown in FIG. 9), respectively, of prism 510. Light sources 512a and 512b are preferably each an array of LEDs. However light sources 512a and 512b can be any light sources that will illuminate the interior of prism 510. It is also contemplated that image acquisition system 508 include only one or more than two light sources.

Operation of light acquisition system 508 is shown in FIGS. 10A and 10B. As shown, incident light 524 emitted from a region of light source 512a near imaging surface 518 is incident on imaging surface 518 at an angle greater than the critical angle of imaging surface 518. Thus, in regions of imaging surface 518 where there are fingerprint valleys 509 incident light 524 undergoes total internal reflection and reflected light 530a will strike triangular surface 521 of prism 510. Reflected light will then either pass through surface 521, or scatter off of surface 521. On the other hand, incident light 524 which strikes a fingerprint ridge 511 will primarily undergo scattering, though a relatively small portion of such incident light 524 will be absorbed. Scattered light 530b will radiate in the direction of viewing surface 520 and pass therethrough and into lens assembly 514. As shown in FIG. 10B, which is a partial perspective view of prism 510 and light sources 512a and 512b, the incident light 524 emitted by light source 512a or 512b near prism edge 557 between imaging surface 518 and viewing surface 520 will first be totally internally reflected off imaging surface 518. Then, because of the proximity of viewing surface 520 to imaging surface 518 near edge 557, will totally internally reflect off of viewing surface 520, and not enter lens assembly 514. Thus, near edge 557, prism 510 acts as a light guide and light which exits viewing surface 520 near edge 557 is substantially all scattered light from imaging surface 518.

Additionally, referring again to FIG. 10A, incident light 524' from a region of light source 512a further away from imaging surface 518 will likely strike imaging surface 518 at an angle less than the critical angle of imaging surface 518. Accordingly, incident light 524' will create an image of fingerprint 535 in the same way that incident light 324 and 424 of image acquisition systems 308 and 408, respectively, does. Incident light 524' tends to provide illumination for a region of imaging surface 518 equidistant between light source 512a and light source 512b and incident light 524 tends to provide illumination for a regions near the edges of imaging surface 518 which are adjacent to end triangular surfaces 519 and 521. In this way, light sources 512a and 512b provide relatively even illumination over the entirety of imaging surface 518. Thus, image acquisition system 508 can advantageously generate a relatively uniform image of fingerprint 535.

As discussed above, image acquisition system generates an image of fingerprint 535 with substantially all scattered light. Thus, as with image acquisition system 308 and 408, the image produced by image acquisition system 508 is relatively high contrast. Additionally, as shown in FIG. 10A, lens assembly 514 is preferably wide enough to extend from triangular face 519 to triangular face 521. Thus, lens assembly 514 can be placed relatively close to viewing surface 520. This advantageously allows acquisition system 508 to be relatively more compact.

Further, prism 510 has base angles 540 and 541 that preferably measure above 50 degrees and more preferably measure between 50 degrees and 65 degrees and most preferably measure 62 degrees of 63 degrees. Accordingly, as with image acquisition systems 308 and 408, scattered light 530a and 530b refracts as it exits viewing surface 520. This allows lens assembly to be tilted with respect to viewing surface 520 to reduce trapezoidal distortion without substantial loss of image intensity.

Though as shown in FIGS. 8 through 10, light sources 514a and 514b can essentially be co-extensive with end triangular surfaces 519 and 521, respectively, it is also contemplated that light sources located on end triangular surfaces 519 and 521 of prism 510 cover only a portion of each surface 519 and 521. For example, as shown in FIGS. 11 and 12, the light sources can be relatively narrow strip light sources. FIGS. 11 and 12 show prism 510 with strip light sources 572a and 572b attached to triangular surfaces 519 and 521, respectively. Strip light sources 572a and 572b run along edges 518a and 518b, respectively, where end triangular surfaces 519 and 521, respectively, meet imaging surface 518. Light sources 572a and 572b are each preferably a single row of LEDs. However, any relatively narrow strip light sources that will illuminate the interior of prism 510 can be used.

Light sources 572a and 572b operate in a manner similar to light sources 512a and 512b, respectively, to illuminate imaging surface 518. However, because there is no portion of light sources 572a and 572b at a region of end triangular surface relatively distal from imaging surface 518, illumination by light sources 572a and 572b may not be as uniform as with light sources 512a and 512b. However, light sources 572a and 572b otherwise illuminate imaging surface 518 in substantially the same way as light sources 512a and 512b, thus, all the additional advantages of image acquisition system 508 are retained. Further, because light sources 572a and 572b are smaller than light sources 512a and 512b, respectively, light sources 572a and 572b can advantageously be relatively less costly to manufacture and can consume relatively less power. Image acquisition system 508 can be fabricated in substantially the same manner and with substantially the same components as image acquisition systems 308 and 408.

Another embodiment of the present invention which utilizes, as image acquisition apparatus 508 does, totally internally reflected light to generate a scattered light image of a fingerprint, is shown in FIGS. 13 and 14. FIG. 13 is a side view of an image acquisition apparatus 608 including an isosceles triangular prism 610, a light source 612, a lens assembly 614 and an image sensor 616. Like prisms 310, 410 and 510, prism 610 includes an imaging surface 618 against which a fingerprint 635 is placed, a viewing surface 620 through which an image of fingerprint 635 is projected, and a light receiving surface 622 through which the interior of prism 608 is illuminated. Light source 612 is located adjacent to light receiving surface 622 and, as shown in FIG. 14 which is a perspective view of prism 610 including light source 612, can be essentially co-extensive therewith. Lens assembly 614 picks up an image of fingerprint 635 and focuses the image onto image sensor 616.

In a manner similar to that of image acquisition apparatus 508, incident light 624 from light source 612 strikes either a region of image surface 618 where there is a fingerprint ridge 611 or a fingerprint valley 609. Preferably, apex angle 642 of prism 610 opposite light receiving surface 622 is small enough such that imaging surface 618 is close enough to viewing surface 620 to create a light-guide effect in prism 610. That is, if imaging surface 518 is close enough viewing surface 620, incident light 624 striking a region of image surface 618 where there is a fingerprint valley 609 will strike imaging surface 618 at an angle greater than the critical angle and undergo total internal reflection. Totally internally reflected light 630a will then strike viewing surface 620 and rather than passing through viewing surface 620 and into lens assembly 614, will once again undergo total internal reflection. This will continue until the totally internally reflected light 630a is either entirely attenuated or exits prism 610 through apex 665 opposite to light receiving surface 622. However, incident light 624 striking a region of image surface 618 where there is a fingerprint ridge 611 will primarily scatter off fingerprint ridge 611. A portion of this scattered light 630b will exit prism 610 through viewing surface 620 and be picked up by lens assembly 614 which will focus scattered light 630b onto image sensor 616. Thus, the image of fingerprint 635 will be relatively bright at fingerprint ridges 611 and relatively dark at fingerprint valleys 609.

In the manner described above, prism 610 acts essentially as a light guide to contain incident light 624 which is not scattered by a fingerprint ridge 611 and creates an image of fingerprint 635 using primarily scattered light. Accordingly, an image generated by image acquisition system 608 will have relatively high contrast and can be made relatively compact by placing lens assembly 614 relatively close to viewing surface 620.

Moreover, isosceles prism 610 preferably includes base angles 640 and 641 which are greater than 50 degrees. Also, index of refraction of prism 410 is preferably greater than 1. As such, when scattered light 630 passes through viewing surface 620, scattered light 630 will refract away from a line normal to viewing surface 620. Thus, as shown in FIG. 13, the lens plane of lens assembly 614 can be tilted with respect to viewing surface 620 to advantageously reduce trapezoidal distortion and scattered light 630 can still enter lens assembly 620 substantially normal to the lens plane. Thus, as with image acquisition system 308, 408 and 508 the intensity of the image of fingerprint 635 can remain relatively high.

It is not necessary that an image acquisition system using a light-guide type refractors such as prism 510 or prism 610 be limited to using a triangular prism. Other light refractors which act as light guides can also be used in an image acquisition system. For example, FIGS. 15 and 16 shows a side and top view, respectively, of an image acquisition system 708 including a circular concave lens 710; light sources 712a, 712b, and 712c; lens assembly 714; and image sensor 716. Concave lens 710 includes a concave imaging surface 718, a flat viewing surface 720, and a circular light receiving surface 722. Light sources 712a, 712b and 712c are preferably equidistantly spaced about the circumference of light receiving surface 722. It is also contemplated that image acquisition device include only one, two or more than three lights sources.

In a manner similar to prism 610, concave lens 710 acts a light-guide. In particular incident light 724 from light sources 712a, 712b, and 712c strikes imaging surface 718 at an angle greater than the critical angle for imaging surface 718. Accordingly, in regions of imaging surface 718 where there is a fingerprint valley 709, incident light 724 undergoes total internal reflection. Reflected light 730 then propagates through concave lens 710 without passing through viewing surface 722 to enter lens assembly 714. When incident light 724 strikes an area of imaging surface 718 where there is a fingerprint ridge 711, incident light 724 is primarily scattered and some of scattered light 730 passes through viewing surface 718 and is focused by lens assembly 714 onto image sensor 716. In this way, image acquisition system 708 generates an image of fingerprint 735 wherein fingerprint ridges 711 are relatively bright and fingerprint valleys 709 are relatively dark.

When using an image acquisition surface having a flat imaging surface, a two dimensional image of a fingerprint could be placed on the imaging surface rather than an actual fingerprint. In this way, it could be possible to "trick" the processing and comparison apparatus connected to an image acquisition system into registering a false match between the two dimensional copy of a fingerprint and a real fingerprint. However, imaging surface 718 of lens 710 is concave. Thus, it would advantageously be more difficult to place a two-dimensional image of a fingerprint on imaging surface 718 and thereby "trick" the processing and comparison apparatus connected to image acquisition system 708. Additionally, concave imaging surface 718 will more closely match the curved contour of a thumb or finger which fingerprint is being imaged. This means that it is likely that a higher portion of the surface of a fingerprint will come into contact with imaging surface 718, thereby allowing a larger area of a fingerprint to be imaged. This can advantageously reduce errors in processing and comparison of fingerprints.

Although the object lens assembly 714 of image acquisition system 708 is separate from concave lens 710, it is within the ambit of the present invention for the first object lens in lens assembly 714 and concave lens such as lens 710 to be formed as a single unit. Such an image acquisition system is shown in FIG. 17. Image acquisition system 808 includes a lens 810 which has an imaging surface 818 which is concave and a viewing surface 822 which is convex.

Image acquisition system 808 also includes light sources 812a, 812b, which are substantially the same as light sources 712a, 712b, and can include a third light source substantially the same as light source 712c. Image acquisition system 808 also includes an image sensor 816 and a lens assembly 814 which may or may not include an object lens. It is also contemplated that image acquisition system 808 not include a lens assembly separate from lens 810. Rather, it is within the scope of the present invention to incorporate the lens assembly 814 into lens 810 as a single unit.

Image acquisition system 808 functions in substantially the same manner as image acquisition system 708 and, thus, includes all the advantages thereof. It is also contemplated that imaging surface 818 of lens 810 be flat rather than concave, as shown in FIG. 18.

Many widely different embodiments of the present invention may be constructed without departing from the spirit and scope of the present invention. It should be understood that the present invention is not limited to the specific embodiments described in the specification. For example, though the above disclosed embodiments of the present invention are described with reference to imaging a fingerprint, any other type of patterned object is contemplated to be imaged with the present invention.

What is claimed is:

1. A compact apparatus for forming a high contrast, low distortion image of a patterned object including:
   a light refractor for reflecting and refracting light, the light refractor including:
      an imaging surface against which a patterned object to be imaged is to be placed;
      at least one light entrance surface adjacent to the imaging surface and through which light enters the refractor; and
      a viewing surface adjacent to the imaging surface and through which an image of the object to be imaged is projected and which is the same surface as the light entrance surface;
   a further surface positioned between and different from the imaging surface and the light entrance surface;
   at least one focusing lens adjacent to the viewing surface and for receiving and focusing an image of a patterned object projected through the viewing surface; and
   at least one light source located adjacent to the light receiving surface and for emitting incident light which enters the light refractor to create an image of the patterned object at the viewing surface, the image focused by the at least one focusing lens, the light source positioned such that light emitted therefrom and entering the light refractor strikes at least the further surface at an angle greater than the critical angle of the further surface before striking the imaging surface at an angle less than the critical angle of the imaging surface such that the image of the patterned object from the imaging surface and projected through the viewing surface is generated by substantially all scattered light from the imaging surface.

2. The apparatus of claim 1 wherein the light refractor is a five faced triangular prism and the imaging surface includes a first rectangular face of the triangular prism different from both the viewing surface and the light entrance surface.

3. The apparatus of claim 2 wherein light reflected from the further surface strikes the imaging surface at an angle less than a critical angle of the imaging surface.

4. The apparatus of claim 3 wherein the triangular prism is an isosceles prism.

5. The apparatus of claim 4 wherein:

the triangular prism includes:
- a first edge opposite the imaging surface and adjacent to the light entrance surface; and
- a second edge adjacent to the imaging surface; and the light source is a strip of light emitting diodes (LEDs) oriented towards and parallel with the light entrance surface and adjacent to the first edge such that the LED strip does not pass through a plane normal to the light entrance surface and intersecting with the second edge.

6. The apparatus of claim 5 wherein the viewing surface includes the light entrance surface.

7. The apparatus of claim 6 wherein a light shield is positioned along a linear path between the light source and the image sensor so as to block light directly emitted from the light source from reaching the image sensor.

8. The apparatus of claim 5 wherein the further surface includes a light diffusing face, such that the light reflecting off the further surface before surface before striking the imaging surface is diffused by the light diffusing face.

9. The apparatus of claim 8 wherein a portion of the light receiving surface is mirrored towards the interior of the triangular prism.

10. The apparatus of claim 9 wherein a portion of the light receiving surface includes a light absorbing surface.

11. The apparatus of claim 10 wherein a portion of the further surface adjacent to the first edge is mirrored towards the interior of the triangular prism.

12. The apparatus of claim 11 wherein:

- a lens plane of the focusing lens is tilted with respect to a plane defined by the viewing surface so as to reduce a difference in image light path lengths between different portions of an object to be imaged; and
- the base angles of the isosceles triangular prism are greater than 45 degrees, such that trapezoidal distortion of an image is reduced.

13. The apparatus of claim 12 wherein the angle between the base angles of the isosceles triangular prism are between 50 degrees and 65 degrees, inclusive.

14. The apparatus of claim 5 wherein a portion of the light receiving surface adjacent to the first edge and facing the light source is streaked to cause diffusion of light passing through the light receiving surface.

15. The apparatus of claim 5 wherein the viewing surface is between the light entrance surface and the imaging surface.

16. The apparatus of claim 15 wherein a portion of the viewing surface adjacent to the first edge is mirrored towards the interior of the triangular prism.

17. The apparatus of claim 16 wherein a light shield is positioned along a linear path between the light source and the image sensor so as to block light directly emitted from the light source from reaching the image sensor.

18. The apparatus of claim 17 wherein a portion of the light receiving surface adjacent to the first edge and facing the light source is streaked to cause diffusion of light passing through the light receiving surface.

19. The apparatus of claim 2 wherein:

the triangular prism includes a first triangular end face opposite a second triangular end face; and the at least one light source extends along and is co-extensive with an edge formed between the first triangular end face and a rectangular face of the triangular prism.

20. The apparatus of claim 19 wherein the at least one lens adjacent to the viewing surface is at least as wide as the viewing surface.

21. The image acquisition apparatus of claim 1 housed in a computer input device.

22. The device of claim 21 wherein the computer input device includes a mouse and the image acquisition system is housed inside the mouse.

23. The device of claim 22 wherein the refractor includes a isosceles triangular prism.

24. A method of imaging a patterned object comprising:

providing a light refractor having an imaging surface, a light receiving surface, a viewing surface which is the same as the light receiving surface and a further surface different from and between the light receiving surface and the imaging surface;

placing the patterned object against the imaging surface of the light refractor;

projecting incident light from a light source through the light receiving surface of the light refractor;

reflecting the incident light off at least the further surface at an angle greater than the critical angle of the further surface before the incident light strikes the imaging surface at an angle less than the critical angle of the imaging surface and scattering the incident light off the imaging surface and patterned object and through the viewing surface.

25. The method of claim 24 further including the steps of:

providing a lens adjacent to the viewing surface; and projecting the scattered light from the viewing surface into the lens to form an image of the patterned object.

26. The method of claim 25 wherein providing a light refractor includes providing an isosceles triangular prism having base angles which measure greater than 45 degrees.

27. The method of claim 26 wherein reflecting the incident light off the further surface of the triangular prism includes scattering the incident light off the further surface of the triangular prism.

28. The method of claim 27 wherein the step of providing a lens includes tilting the lens plane of the lens with respect to a plane of the viewing surface to reduce trapezoidal distortion in the image of the patterned object.

* * * * *